United States Patent [19]

Bell et al.

[11] 4,038,066

[45] July 26, 1977

[54] METHOD OF STRIPPING BASE METALS FROM FUSED SALTS

[75] Inventors: Malcolm Charles Evert Bell, Sudbury; Thijs Eerkes; Ramamritham Sridhar, both of Mississauga, all of Canada

[73] Assignee: The International Nickel Company, Inc., New York, N.Y.

[21] Appl. No.: 482,249

[22] Filed: June 24, 1974

[30] Foreign Application Priority Data

July 13, 1973    Canada ................................ 176365

[51] Int. Cl.² .............................................. C21B 15/00
[52] U.S. Cl. ........................................ 75/29; 75/63;
                                        75/72; 75/82; 423/561 R
[58] Field of Search .................. 75/63, 82, 64, 85, 70,
                                        75/86, 72, 29, 77; 423/561

[56] References Cited

U.S. PATENT DOCUMENTS

| 1,737,888 | 12/1929 | McIntosh | 75/85 |
|---|---|---|---|
| 2,990,270 | 6/1961 | Lefever | 75/82 X |
| 3,291,597 | 12/1966 | Mellgren | 75/63 |
| 3,802,870 | 4/1974 | Bell | 75/82 |

*Primary Examiner*—M. J. Andrews
*Attorney, Agent, or Firm*—Miriam W. Leff; Ewan C. MacQueen

[57] ABSTRACT

Base metal chlorides are recovered from fused alkali metal or alkaline earth metal halide salts by precipitation with at least one reagent selected from the group consisting of hydrogen, hydrogen sulfide or aluminum. Advantageously, the bulk of the base metals are precipitated by combinations of hydrogen sulfide and hydrogen to produce a precipitate having a controlled sulfur content that is molten at temperatures between about 750° C. and 900° C., and final salt cleaning is achieved by precipitating residual base metals with aluminum. The melting point of the precipitate is also controlled by the ratio of nickel to other base metals in the salt.

25 Claims, No Drawings

METHOD OF STRIPPING BASE METALS FROM FUSED SALTS

The present invention pertains to the recovery of base metals from fluxes, and more particularly to the precipitation of base metals from fused chloride salts containing base metals as chlorides.

A number of processes have been proposed for refining non-ferrous metals, alloys, or mattes by chlorination in which the chlorinated impurities are fluxed in fused chloride salts. The refining operations of these processes are highly effective, but the lack of an economical process for stripping the chlorinated impurities from the fused salts has hindered implementation of these processes on a commercial scale.

It has, for example, been suggested that the fused salt be solidified, comminuted, leached with water and base metals precipitated from the aqueous solution. Although this process recovers the chlorinated impurities, regeneration of the salt for re-use is unduly expensive involving the expenditure of large amounts of fuel for water evaporation and remelting of the salts.

In another process, it is suggested to regenerate the fused salt by precipitating the dissolved base metals and to generate chlorine for re-use by electrolysis. While this process is an improvement over prior processes, it suffers the drawbacks that the current density in the electrolytic cell falls off as the base metals are precipitated and that the precipitated solid metals are difficult to remove from the electrolytic cell, which metals when finally removed from the cell contain substantial quantities of occluded salt.

Another approach to stripping base metals from fused salts is the addition of magnesium in the form of magnesium alloys to the fused salts to strip out the base metals by exchange. A portion of the salt is periodically removed to an electrolytic cell where the salt is electrolyzed to regenerate magnesium metal at the cathode and chlorine at the anode, both of which are recycled to the process. Because the magnesium metal is liquid at operating temperatures, higher current efficiencies are realized during electrolysis and magnesium is readily removed from the cell.

Processes that rely on electrolysis for recovery of base metals or other precipitants have several drawbacks. For example, large quantities of molten chlorides at high temperature must be circulated between refining vessels and electrolytic cells. Electrolytic cells, moreover, involve relatively high capital expenditures.

It has been discovered that base metals dissolved as chlorides in fused chloride salts can be readily recovered by precipitation with special reagents causing the base metals to collect in an easy to separate molten phase and hence regenerating the solvent salt without undue contamination.

Generally speaking, the present invention involves a process for stripping base metals dissolved as chlorides in a fused chloride solvent of at least one member selected from the group consisting of alkali metal and alkaline earth metal. The process comprises contacting the fused salt containing the base metal chloride with at least one precipitant selected from the group consisting of hydrogen, hydrogen sulfide and aluminum to precipitate the base metal and to regenerate the fused chloride solvent.

The process in accordance with the present invention is advantageously used in conjunction with chlorination refining processes in which a chloride salt cover is employed in a metal or matte refining process to flux chlorinated impurities. For example, nickel matte can be refined with respect to antimony, arsenic, bismuth, cobalt, copper, iron, lead, tin, and zinc by chlorinating molten nickel matte with a fused chloride salt cover of at least one member selected from the group consisting of alkali metals and alkaline earth metals. Insofar as the process in accordance with the present invention is concerned, the exact composition of the chloride salt can vary over wide ranges as long as the salt has a melting point below about 750° C. and a low vapor pressure at temperatures up to about 900° C. Mixtures of the various salts are advantageously employed to provide a eutectic composition so that upon fusion the solution has a low viscosity and low vapor pressures at operating temperatures. The salts or mixtures of salts should also be capable of dissolving base metal chlorides. Examples of salts and mixtures include sodium chloride, lithium chloride, potassium chloride, magnesium chloride, calcium chloride and mixtures of two or more of the foregoing. A particularly advantageous salt cover in terms of melting point, vapor pressure, solvent action and cost is a mixture of equal parts of sodium chloride and potassium chloride. Other advantageous salt mixtures include calcium chloride-sodium chloride, calcium chloride-potassium chloride, calcium chloride-calcium fluoride, lithium chloride-sodium chloride, lithium chloride-calcium chloride, magnesium chloride-sodium chloride and magnesium chloride-potassium chloride. It is to be noted that all solid and liquid compositions are given on a weight basis and gaseous compositions on a volumetric basis unless otherwise expressly stated.

In order to give those skilled in the art a better understanding of the process in accordance with the present invention, an overall process involving the purification of nickel matte will be described but it will be understood that the present invention is not dependent upon how the loaded salt was produced. The process in accordance with the present invention will work equally well on molten chloride salts formed in purifying copper matte, metals or alloys.

The processing of nickel sulfide ores conventionally involves the production of a Bessemer matte, i.e., a sulfur deficient nickel bath from which most of the iron has been removed by oxidation and slagging. If the matte contains large amounts of copper, it can be slow cooled to effect a separation of nickel sulfide from copper sulfide by well known means. Whether or not copper is removed by slow cooling, the nickel sulfide still contains amounts of impurities, including copper, that are commercially unacceptable for some applications. These impurities include antimony, arsenic, bismuth, cobalt, iron, lead, tin, and zinc. Such nickel sulfide can be refined by establishing a molten bath of the nickel sulfide and a molten salt cover of at least one chloride of a metal selected from the group consisting of alkali metals and alkaline earth metals and passing a gaseous chlorine through the molten nickel matte at a temperature between about 750° C. and 900° C. to chlorinate the impurities and to dissolve the chlorinated impurities in the salt cover. The molten salt loaded with nickel chloride and the chlorinated impurities is removed from the nickel matte, preferably on a continuous basis, and is treated in accordance with the present invention to recover nickel and other chlorinated base metals, preferably on a continuous basis. Advantageously, the chlorination and the recovery of the chlorinated base metals are conducted in a continuous and countercurrent fashion.

The chloride salt loaded with the chlorinated base metals is maintained at a temperature above its liquids but at temperatures below that at which appreciable volatilization of the base metal chlorides or the salt covers occurs. In most instances, temperature between about 750° C. and 1000° C., and advantageously between about 800° C. and 900° C., are employed to provide economically attractive stripping rates while minimizing base metal losses and the problems associated with refractory wear.

The molten chloride salt loaded with chlorinated base metals is treated with at least one precipitant selected from the group consisting of hydrogen, hydrogen sulfide and aluminum. When hydrogen is employed as a precipitant, it reduces the base metal chlorides to metal and forms hydrogen chloride which is easily removed from the system for subsequent use. Hydrogen sulfide, on the other hand, reacts by exchange forming base metal sulfides and hydrogen chloride which can be used to regenerate hydrogen sulfide by leaching the precipitated base metal sulfides and this will yield a leach solution which can be treated by hydrometallurgical techniques to recover the base metals. Aluminum replaces the base metal chlorides in the molten salts forming aluminum chloride which is readily expelled from the salt because of the high vapor pressure. From the foregoing it is seen that the precipitants employed in the present invention react to form gaseous products of reaction that are readily expelled from the salt thereby minimizing contamination of the salt and leaving the salt ready for immediate re-use.

Two or more precipitants can be simultaneously or sequentially employed, or one or more precipitants can be added in stages in order to control the nature of the precipitate. For example, hydrogen is rarely employed alone as it precipitates a solid metal product which is difficult to separate from the salt. On the other hand, hydrogen is used in combination with hydrogen sulfide to control the sulfur content of the precipitate to adjust the melting point thereof. Sulfide precipitates obtained by using hydrogen sulfide alone contain over 29% sulfur and depending on the base metal content the melting point of the precipitates may be higher than 900° C. For example, for salts with a nickel to cobalt plus iron ratio greater than about one, the sulfur content in the precipitate has to be controlled between about 23% and 29% to obtain a molten base metal sulfide precipitate. Without sulfur control the matte has a sulfur content of 31% and is solid at 900° C. This is avoided by using hydrogen/hydrogen sulfide mixtures in the salt cleaning vessel. Other means of sulfur control can also be employed. These methods include recycle of high nickel content alloys and recycling of mattes that contain less than about 20% sulfur. Initially the base metals can be precipitated by hydrogen, hydrogen sulfide or mixtures thereof with the last and most difficult portion of the base metals being subsequently stripped with aluminum. By this combination of steps, the base metal content in the fused chloride solvent can be lowered to less than about 0.1%. The addition of precipitants in stages selectively precipitates the chlorinated base metals with nickel being precipitated before copper, cobalt, and iron, and cobalt and copper being precipitated before iron.

The sulfur content of the precipitate is not the only factor that determines the physical state of the precipitate and the relative ease of separating the precipitate from the fused salt. Another important factor is the ratio of nickel to other base metals in the precipitate. In order for the precipitate to be readily separable from the fused salt, the precipitate should have a sulfur content between about 23% to 29% and a nickel to cobalt and/or iron ratio should be greater than about 1:1 and nickel to copper ratio greater than about 2:1. The ratios of nickel to base metals in the precipitate is most readily controlled by adjusting the nickel to base metal concentration in the fused salt. The nickel to base metal ratio in the fused salt is in turn controlled by how the chlorination operation is conducted. For example, if chlorination is achieved by bubbling gaseous chlorine through molten nickel matte having a fused salt cover, chlorination is continued sufficiently long to insure that adequate amounts of nickel are chlorinated and dissolved in the fused salt cover to provide the minimum nickel to base metal ratios required for producing a liquid precipitate during the precipitation treatment. Liquid precipitates can be insured by incorporating sufficient amounts of nickel chloride in the fused salt to provide thereon nickel to cobalt and/or iron ratios of about one or more and nickel to copper ratios of about two or more. When refining nickel mattes containing significant amounts of iron, cobalt, and copper, the chlorination treatment is conducted long enough to incorporate sufficient nickel chloride in the fused salt to satisfy both of the above ratios, i.e., the ratio of nickel to base metals in the salt will be greater than about 1 and can be below about 2 depending upon the ratio of cobalt plus iron to copper. For example, if the ratio of cobalt plus iron to copper in the fused salt is about 1:1 the nickel to cobalt plus iron plus copper ratio should be at least about 1.5:1. Although adjustment of the nickel to base metal ratio is advantageously conducted during chlorination, such adjustment can also take place during precipitation by adding nickel chloride to the salt thereby bringing the nickel to base metal ratio up to desired levels. It should be noted that when treating fused salts containing large amounts of copper, i.e., greater than about 3%, a separate sulfur adjustment step is not required as long as the salt has a nickel to copper ratio greater than about 2 and a nickel to cobalt plus iron plus copper ratio above about 1.5.

When aluminum is used after hydrogen sulfide precipitates, it is advantageous to bubble nitrogen through the salt to remove any dissolved hydrogen sulfide and aluminum precipitation is carried out in a separate compartment to avoid the presence of sulfide. Aluminum can advantageously be added as an aluminum copper alloy. It is advantageous to use aluminum for final cleaning because it gives a very clean salt suitable for recycle. During aluminum precipitation when copper is present, the presence of sulfides should be minimized because copper will re-enter the salt rendering the aluminum precipitation step less efficient.

The cobalt, copper, iron and nickel matte resulting from the stripping operation can be further treated by well known extractive metallurgical processes to recover the valuable components. The hydrogen chloride generated by hydrogen or hydrogen sulfide, or by hydrolysis of aluminum chloride vapors generated by aluminum stripping, can be made to react with the cobalt, copper, iron and nickel matte suspended in water in a finely divided state. The hydrogen chloride will react with the matte forming a concentrated chloride solution of cobalt, iron and nickel, hydrogen sulfide and a copper sulfide residue. The solution can be treated for iron precipitation and then for nickel-cobalt separation and recovery. The hydrogen sulfide can be scrubbed of hydrogen chloride, and then recompressed for use in the salt stripping operation.

In order to give those skilled in the art a better appreciation of the advantages flowing from the practice of the present invention, the following illustrative examples are given:

EXAMPLE I

A salt mixture of equal parts of sodium chloride and potassium chloride and containing 1.9% copper, 1.89% nickel, 0.92% cobalt and 0.7% iron, which was obtained by refining a nickel matte with chlorine, was maintained at 800° C. for 5.5 hours while hydrogen sulfide at a rate of 0.021 kilogram per kilogram of salt per hour was bubbled through the salt. Samples of the salt were taken intermittently and analyzed for copper, nickel, cobalt and iron concentrations. After 0.115 kilogram of hydrogen sulfide per kilogram of salt was added to the salt, the stripping operation was terminated, and the final product was analyzed for copper, nickel, cobalt and iron. During the precipitation nickel metal was added in amounts equal to the weight of the matte precipitated in order to adjust the sulfur content of the matte to provide an easily separated matte product. The composition of the salt at various intervals and at completion as well as the final matte composition are given in Table I.

Reference to the results reported in Table I confirms that the salt is regenerated and that nickel is preferentially precipitated during the early stages of stripping as compared to copper, cobalt and iron. It should also be noted that the copper, cobalt and iron levels of the salt were sufficiently lowered such that the salt could be directly recycled to the matte refining operation.

TABLE I

| | $H_2S$ passed through salt | Analysis | | | |
|---|---|---|---|---|---|
| | Kg/Kg salt | % Cu | % Ni | % Co | % Fe |
| Loaded Salt | 0.000 | 1.9 | 1.89 | 0.92 | 0.70 |
| | 0.021 | 1.85 | 0.19 | 0.87 | 0.96 |
| | 0.042 | 1.23 | <0.05 | 0.48 | 0.85 |
| | 0.063 | 0.63 | <0.05 | 0.16 | 0.63 |
| | 0.094 | 0.45 | <0.05 | 0.07 | 0.40 |
| | 0.115 | 0.29 | <0.05 | 0.03 | 0.25 |
| Final Stripped Salt | | 0.19 | <0.05 | <0.02 | <0.2 |
| Final Matte, 24.7% S | | 16.1 | 42.8 | 10.2 | 7.8 |

EXAMPLE II

This example confirms that salts having higher base metal loadings can advantageously be treated by the process in accordance with the present invention.

A salt of 50% sodium chloride and 50% potassium chloride containing a 3.76% copper, 4.53% nickel, 1.94% cobalt and 1.18% iron was treated in a manner similar to that described in Example I except that hydrogen sulfide at a rate of 0.019 Kg per Kg of salt per hour was passed through the salt at a temperature of 790° C. The results of this test are reported in Table II.

The results in Table II again confirm the effectiveness of hydrogen sulfide in precipitating base metals from molten salts. The results in Table II also confirm that the selectivity of nickel precipitation is even greater for salts having high concentrations of nickel, cobalt, copper and iron.

TABLE II

| | | Analysis | | | | |
|---|---|---|---|---|---|---|
| | Kg/Kg Salt | % Cu | % Ni | % Co | % Fe | % S |
| Loaded Salt | 0.000 | 3.76 | 4.53 | 1.94 | 1.18 | |
| | 0.038 | 3.10 | 0.09 | 1.74 | 1.69 | |
| | 0.057 | 1.17 | <0.05 | 0.58 | 1.30 | |
| | 0.076 | 0.29 | <0.05 | 0.05 | 0.41 | |
| | 0.095 | 0.17 | <0.05 | 0.03 | 0.33 | |
| | 0.114 | 0.13 | <0.05 | 0.02 | 0.29 | |
| Final Stripped Salt | | 0.08 | <0.05 | 0.02 | 0.28 | 0.006 |
| Matte recovered | | 16.7 | 39.0 | 10.6 | 7.20 | 23.3 |

EXAMPLE III

The effectiveness of hydrogen in selectively precipitating nickel from fused chloride salts is demonstrated by the Example.

A loaded molten salt of equal parts of sodium chloride and potassium chloride containing a 3.75% copper, 4.51% nickel, 1.64% cobalt and 1.12% iron was maintained at 790° C. while hydrogen at a rate of 0.0022 kilogram per kilogram of salt per hour was bubbled through the salt. Intermittently samples of the salt were taken and analyzed for copper, nickel, cobalt and iron. The results are reported in Table III, which results confirm that hydrogen is highly selective in precipitating nickel from fused salts also containing copper, cobalt and iron.

TABLE III

| | $H_2$ Passed through salt | Salt Analysis | | | |
|---|---|---|---|---|---|
| | Kg/Kg salt | % Cu | % Ni | % Co | % Fe |
| Loaded Salt | 0.0000 | 3.75 | 4.51 | 1.64 | 1.12 |
| | 0.0061 | 4.17 | 0.59 | 1.76 | 0.95 |
| | 0.0083 | 4.09 | 0.11 | 1.45 | 0.95 |
| | 0.0104 | 4.07 | 0.05 | 1.16 | 0.93 |

EXAMPLE IV

The Example shows the sequential use of two precipitants.

A fused salt mixture of equal parts of sodium chloride and potassium chloride also initially containing 3.57% copper, 4.51% nickel, 1.64% cobalt and 1.12% iron was treated at 780° C. with 0.0023 kilogram of hydrogen sulfide per kilogram of salt to provide a partially stripped salt containing 3.57% copper, less than 0.05% nickel, 0.43% cobalt and 0.85% iron. Increasing amounts of aluminum, as pure aluminum pellets, were added to the partially stripped salt while holding the salt at 780° C. The salt was sampled at different aluminum additions, and the samples were analyzed for copper, nickel, cobalt and iron as well as for aluminum. The results are reported in Table IV. The results in Table IV show that the copper, nickel, cobalt and iron contents of the fused salts can be reduced to very low levels by using aluminum as a precipitant without unduly increasing the aluminum content of the fused salt. This example also confirms that nickel can be selectively stripped from loaded fused salts by precipitation with hydrogen sulfide and that the partially stripped salt can be further stripped to very low base metal contents for recycle to matte refining operations by use of alumium as a precipitant.

TABLE IV

| Wt. % Aluminum Added | Salt Analysis | | | | |
|---|---|---|---|---|---|
| | % Cu | % Ni | % Co | % Fe | % Al |
| 0 | 3.57 | <0.05 | 0.43 | 0.85 | |
| 0.8 | 2.08 | 0.027 | 0.19 | 0.56 | 0.39 |
| 1.25 | 1.15 | 0.13 | 0.14 | 0.39 | 0.60 |
| 1.69 | 0.33 | 0.009 | 0.006 | 0.14 | 0.79 |
| 2.09 | 0.06 | 0.009 | 0.005 | 0.018 | 0.84 |

EXAMPLE V

This example demonstrates that a combination of hydrogen sulfide and hydrogen can be employed to control the sulfur content of the matte precipitated from a fused chloride solvent containing chlorides of nickel, cobalt, copper and iron.

The fused chloride solvent of sodium chloride and calcium chloride with a weight ratio of sodium chloride to calcium chloride of 1.85:1 was employed for refining nickel matte by chlorination. After matte refining the fused chloride solvent had the composition given in Table V.

The fused chloride solvent containing the chlorinated metal values was transferred to another vessel that contained, for test purposes, a refined sulfur deficient nickel matte for collecting the base metals precipitated from the fused chloride solvent. The nickel matte, the composition of which is given in Table V, was employed in amounts to provide a fused chloride solvent to nickel matte weight ratio of 6:1.

The nickel matte with the fused chloride solvent cover was heated to and maintained at 815° C. Hydrogen at a rate equivalent to 15 liters per kilogram of fused chloride solvent per hour was bubbled through the lower matte phase while hydrogen sulfide at a substantially identical rate was bubbled through the upper fused chloride solvent layer. Samples of the fused chloride solvent were taken at various time intervals and were analyzed for nickel, copper, cobalt, and iron. The analyses are given in Table V. After 350 minutes the stripping treatment was terminated, and both the fused chloride solvent and the matte were analyzed with the results being reported in Table V.

From the results shown in Table V it is seen that the sulfur content of the final matte was only 26.8%, at which sulfur level the matte is molten at the stripping temperature. If stripping were effected solely with hydrogen sulfide at a rate of 30 liters per kilogram of fused chloride solvent per hour, the sulfur content of the matte would have been in excess of 29% and the matte would not have been molten at the stripping temperature.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for recovering at least one base metal value selected from the group nickel, cobalt, copper and iron, dissolved as a chloride in a fused chloride solvent consisting of at least one salt selected from the group consisting of alkali and alkaline earth metal halides which comprises contacting the fused chloride solvent containing the base metal chloride with a precipitant comprising hydrogen sulfide to precipitate base metal values in an easy to separate molten phase and to regenerate the fused chloride solvent.

2. The process as described in claim 1 wherein the fused chloride solvent is at least one solvent selected from the group consisting of sodium chloride, lithium chloride, potassium chloride, magnesium chloride, calcium chloride, mixtures of at least two of the foregoing and mixtures of calcium chloride and calcium fluoride.

3. The process as described in claim 2 wherein the mixtures contain substantially equal parts of each component.

4. The process as described in claim 1 wherein the fused chloride solvent containing the dissolved base metal chloride is derived from a nickel matte refining process in which molten nickel matte is refined by bubbling chlorine through the nickel matte to chlorinate at least one impurity selected from the group consisting of cobalt, copper, and iron.

5. The process as described in claim 4 wherein the base metal value is precipitated from the fused chloride solvent at a temperature between about 750° C. and 1000° C.

6. The process as described in claim 4 wherein the base metal value is precipitated from the fused chloride solvent at a temperature between about 800° C. and 900° C.

7. The process as described in claim 5 wherein the fused chloride solvent contains nickel and copper values and the nickel to copper ratio is equal to or greater than about 2.

8. The process as described in claim 5 wherein the fused chloride solvent contains nickel, cobalt and iron values, and the nickel to cobalt plus iron ratio in the solvent is equal to or greater than about 1.

9. The process as described in claim 8 wherein the base metal value is precipitated by a mixture of hydrogen and hydrogen sulfide to produce a molten precipitate having a sulfur content between about 23% and 29%.

10. The process as described in claim 5 wherein the bulk of the base metal values are precipitated from the fused chloride solvent by hydrogen and hydrogen sulfide, said hydrogen sulfide precipitating base metals as

TABLE V

| Phase | Time, Mins. | Weight Ratio of Phase to Initial Matte | Analysis, Weight % | | | | |
|---|---|---|---|---|---|---|---|
| | | | Cu | Ni | Co | Fe | S |
| Initial Matte | 0 | 1 | | 74.0 | | | 26.0 |
| Fused Chloride Solvent | 0 | 6 | 1.02 | 1.74 | 0.40 | 0.33 | |
| " | 60 | | 0.84 | 0.08 | 0.04 | 0.19 | |
| " | 120 | | 0.16 | 0.036 | 0.04 | 0.047 | |
| " | 180 | | 0.048 | 0.010 | 0.007 | 0.021 | |
| " | 350 | | 0.037 | 0.008 | 0.003 | 0.020 | |
| Final Matte | 350 | 1.29 | 4.9 | 66.4 | 0.3 | 1.53 | 26.8 | sulfides, and after separation of precipitated sulfides, residual base metal values in the salt are precipitated as a molten phase by aluminum.

11. The process as described in claim 10 wherein the base metal content of the fused chloride solvent is lowered to less than about 0.1%.

12. A process for recovering at least one base metal value selected from the group nickel, cobalt, copper and iron, dissolved as a chloride in a fused chloride solvent of at least one salt selected from the group consisting of alkali and alkaline earth metal halides which comprises contacting the fused chloride solvent containing the base metal chloride with at least one precipitant comprising hydrogen sulfide to precipitate the base metal values in an easy to separate molten precipitate having a sulfidic content between about 23% and 29%, and to regenerate the fused chloride solvent.

13. The process as described in claim 12 wherein the bulk of the base metal values are precipitated from the fused chloride solvent by hydrogen and hydrogen sulfide, said hydrogen sulfide precipitating base metals as sulfides, and after separation of precipitated sulfides, residual base metal values in the salt are precipitated by aluminum.

14. In a process for refining a sulfidic matte containing at least one of the base metal values nickel, copper, cobalt and iron in the presence of a chlorinating agent for chloridizable impurities in the matte and a fused chloride solvent for dissolving the chloridized impurities, said fused chloride solvent consisting of at least one salt selected from the group consisting of alkali and alkaline earth metal halides and wherein said fused chloride solvent dissolves therein as a chloride at least one of the base metals nickel, copper, cobalt and iron, the improvement comprising separating the fused chloride solvent containing the dissolved base metal chlorides from the matte and contacting said separated fused chloride solvent with a mixture of hydrogen and hydrogen sulfide to strip the fused chloride solvent of said base metal values, and to precipitate the base metal values in an easy to separate molten phase having a sulfur content of between about 23% and 29%, and recovering the stripped fused chloride solvent in the fused state for re-use.

15. In a process for refining a sulfidic matte containing at least one of the base metal values nickel, copper, cobalt and iron in the presence of a chlorinating agent for chloridizable impurities in the matte and a fused chloride solvent for dissolving the chloridized impurities, said fused chloride solvent consisting of at least one salt selected from the group consisting of alkali and alkaline earth metal halides, and wherein said fused chloride solvent dissolves therein as a chloride at least one of the base metals nickel, copper, cobalt and iron, the improvement comprising separating the fused chloride solvent containing the dissolved base metal chlorides from the matte and contacting said separated fused chloride solvent with a precipitant comprising hydrogen sulfide to precipitate base metal values in an easy to separate molten phase and to obtain a stripped fused chloride solvent, and recovering the stripped fused chloride solvent in the fused state for re-use.

16. The process as described in claim 15, wherein the fused chloride solvent is provided as a cover layer on the sulfidic matte.

17. The process as described in claim 15, wherein the base metal is precipitated from the fused chloride solvent at a temperature between about 750° C. and 1000° C.

18. The process as described in claim 15 wherein the fused chloride solvent contains nickel and copper values and the nickel to copper ratio is equal to or greater than about 2.

19. The process as described in claim 15 wherein the fused chloride solvent contains nickel, cobalt and iron values, and the nickel to cobalt plus iron ratio in the solvent is equal to or greater than about 1.

20. The process as described in claim 19 wherein the base metal value is precipitated by a mixture of hydrogen and hydrogen sulfide to produce a molten precipitate having a sulfur content between about 23% and 29%.

21. The process as described in claim 15 wherein the bulk of the base metal values are precipitated from the fused chloride solvent by a reagent comprising hydrogen sulfide, said hydrogen sulfide precipitating base metals as sulfides, and after separation of precipitated sulfides the residual base metal values in the salt are precipitated by aluminum.

22. The process as described in claim 21, wherein the base metal content of the fused chloride solvent is lowered to less than about 0.1%.

23. The process as described in claim 15 wherein the fused chloride solvent loaded with chlorinated impurities is removed from the sulfidic matte and treated to strip impurities therefrom on a continuous basis.

24. The process as described in claim 1 wherein after treatment with said precipitant to precipitate the bulk of the base metal values from the fused chloride solvent as elemental metals or sulfides, sulfides are separated from the fused chloride solvent, and residual base metal values in the solvent are precipitated by aluminum.

25. In a process for refining a sulfidic matte containing at least one of the base metal values nickel, copper, cobalt and iron in the presence of a chlorinating agent for chloridizable impurities in the matte and a fused chloride solvent for dissolving the chloridized impurities, said fused chloride solvent consisting of at least one salt selected from the group consisting of alkali earth metal halides and wherein said fused chloride solvent dissolves therein as a chloride at least one of the base metals nickel, copper, cobalt and iron, the improvement comprising:
  a. if nickel, cobalt and/or iron values are present in the fused chloride solvent, establishing a nickel to cobalt plus iron ratio in the solvent of equal to or greater than about 1, and
  b. if nickel and copper values are present in the fused chloride solvent, establishing a nickel to copper ratio of equal to or greater than 2, separating the fused chloride solvent containing the dissolved base metal chlorides from the matte and contacting said separated fused chloride solvent with a combination of hydrogen and hydrogen sulfide to strip the fused chloride solvent of said base metal values and to precipitate the base metal values in an easy to separate molten phase having a sulfur content of between about 23% and 29%, said hydrogen sulfide precipitating base metals as sulfides, separating the precipitated sulfides from the fused chloride solvent, thereafter treating the resultant fused chloride solvent with aluminum to precipitate residual base metal values in the solvent into a separate molten phase, and recovering the stripped fused chloride solvent in the fused state for re-use.

* * * * *